No. 690,959. Patented Jan. 14, 1902.
A. I. JACOBS.
MACHINE FOR CASING IN BOOKS.
(Application filed July 31, 1901.)
(No Model.) 12 Sheets—Sheet 1.

Fig. 1

Witnesses
Inventor
Arthur I. Jacobs, by
Harry P. Williams
Attorney

No. 690,959. Patented Jan. 14, 1902.
A. I. JACOBS.
MACHINE FOR CASING IN BOOKS.
(Application filed July 31, 1901.)

(No Model.) 12 Sheets—Sheet 7.

Fig. 7

No. 690,959. Patented Jan. 14, 1902.
A. I. JACOBS.
MACHINE FOR CASING IN BOOKS.
(Application filed July 31, 1901.)
(No Model.) 12 Sheets—Sheet 8.

Witnesses
Inventor

No. 690,959. Patented Jan. 14, 1902.
A. I. JACOBS.
MACHINE FOR CASING IN BOOKS.
(Application filed July 31, 1901.)
(No Model.) 12 Sheets—Sheet 9.

No. 690,959. Patented Jan. 14, 1902.
A. I. JACOBS.
MACHINE FOR CASING IN BOOKS.
(Application filed July 31, 1901.)

(No Model.) 12 Sheets—Sheet 10.

Witnesses
C. P. Kilgore
V. R. Holcomb

Inventor
Arthur I. Jacobs,
Harry R. Williams
Attorney

THE NORRIS PETERS CO., PHOTO-LITHO., WASHINGTON, D. C.

UNITED STATES PATENT OFFICE.

ARTHUR I. JACOBS, OF HARTFORD, CONNECTICUT, ASSIGNOR TO THE SMYTH MANUFACTURING COMPANY, OF HARTFORD, CONNECTICUT, A CORPORATION OF CONNECTICUT.

MACHINE FOR CASING-IN BOOKS.

SPECIFICATION forming part of Letters Patent No. 690,959, dated January 14, 1902.

Application filed July 31, 1901. Serial No. 70,427. (No model.)

*To all whom it may concern:*

Be it known that I, ARTHUR I. JACOBS, a citizen of the United States, residing at Hartford, in the county of Hartford and State of Connecticut, have invented certain new and useful Improvements in Machines for Casing-In Books, of which the following is a specification.

This invention relates to a machine for applying paste to the outside leaves of an unbound book and then putting such book into a case and causing the adhesion of the leaves of the case to the pasted leaves of the book.

The object is to produce a machine which will quickly apply the requisite quantity of paste to the outside leaves of an unbound book, accurately feed the book and case together, tightly stretch the back of the case over the back of the book, form close joints between the case and the book along the inner edges of the leaves of the case, and fold and clamp the leaves of the case against the pasted outside leaves of the book.

The machine illustrated has a vertically-reciprocatory plate for supporting the unbound book, two horizontally-reciprocating paste-boxes with rotary rolls that apply more paste near the joints than over the rest of the surfaces of the outside leaves as the unbound book is raised between them on the plate, an adjustable magazine and reciprocating pushers for supporting and feeding the case over the unbound book, and adjustable mechanisms for stretching the back of the case over the back of the book, forming close joints and folding and clamping the leaves of the case against the pasted leaves of the book.

Fig. 9, an end of a paste-box; Fig. 19, the manner of stretching the back of the cover over the back of the book, and Fig. 20 the manner of forming the joint.

On the driving-shaft 1 is a hand-wheel 2 and a pulley 3, that, by means of the clutch 4, may be connected or disconnected with the driving-shaft. The clutch is operated by the lever 8, that is connected with the treadle 9, which extends in front of the base of the machine. On the inner end of the driving-shaft is a pinion 10, that meshes with a gear 11, attached to a gear 12, in mesh with a gear 13, mounted on the cam-shaft 14, Figs. 1, 2, 3, and 4. On the shaft 14, near the middle of the machine, is a cam 15, which oscillates a lever 16, connected to which is a balance-spring 17. The front end of the lever is pivoted to the front frame of the machine, and the back end is by a link 18 connected with a carriage 19, which is movable vertically in an opening in the back frame of the machine, Fig. 5. An arm 20 projects forwardly from this carriage, and adjustably held by this arm is the vertical book-supporting plate 21. On each side, near the top of the supporting-plate, is a gage-finger 22, against which the top of the unbound book is placed, as in Fig. 4, to assure its exact location on the plate. Perforations 23 are made in the plate, so the position of the fingers may be altered for different sizes of books. The plate is guided during its vertical movement by pins 24, that project from the front and back frames.

Figure 5:
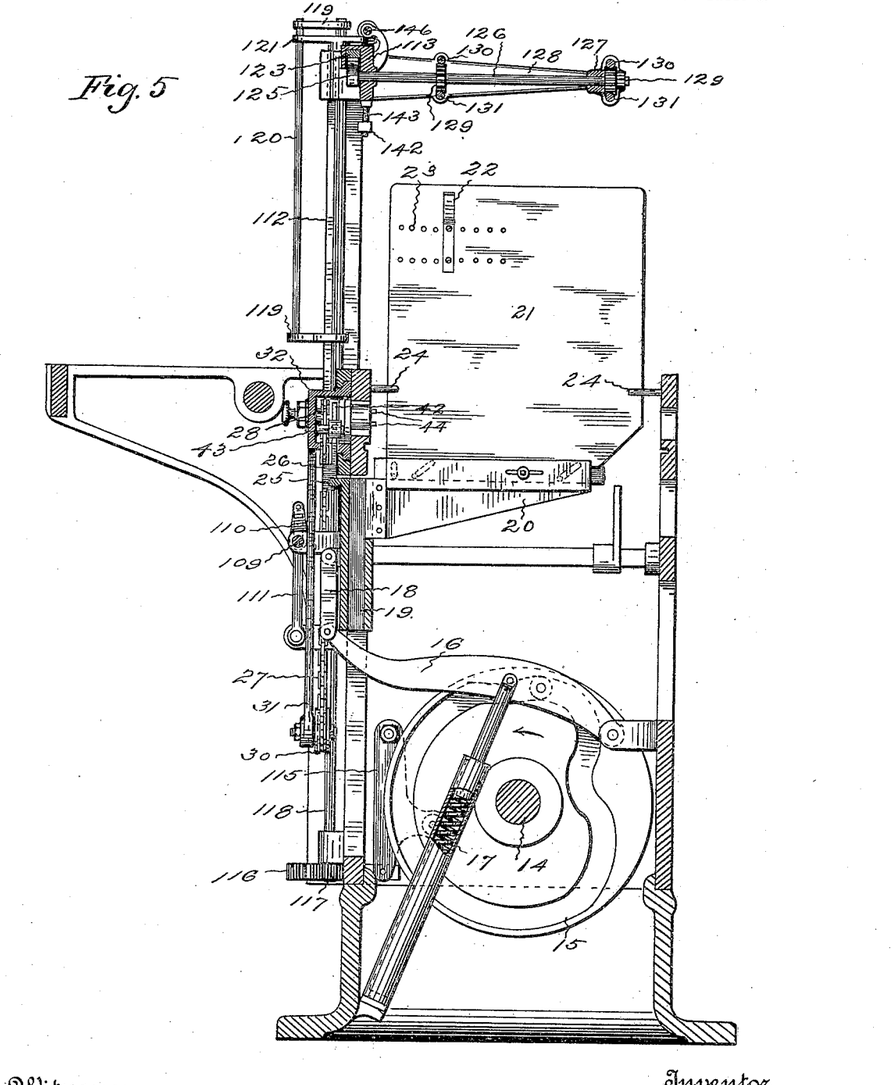
Fig. 5, a vertical section on the plane indicated by the line 5 5 of Fig. 2 looking in the direction indicated by the arrow.
Figure 10:
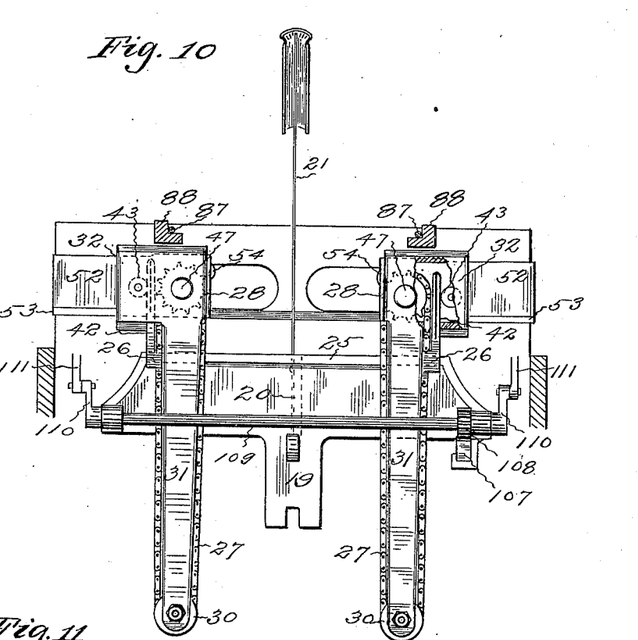
Fig. 10, a back view of the paste mechanism with the boxes away from each other.
Figure 11:
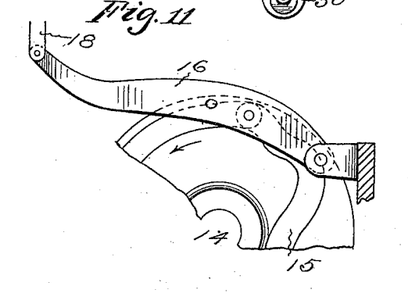
Fig. 11, a portion of the cam and lever for elevating the carriage with the supporting-plate.

These pins are yielding, so that the plate may adjust itself if the book is placed upon the plate with more on one side than on the other, Fig. 5. Extending across the upper edge of the carriage and projecting rearwardly is a rib 25. This rib extends into openings in the links 26 of two chains 27, that pass around sprocket-wheels 28, connected with clutch parts 29, and around idlers 30 at the lower end of arms 31, that project downwardly from boxes 32, which are movable with the paste-boxes toward and from each other on the back side of the machine, Figs. 8, 10, and 14. Projecting inwardly from each box is a hollow stud 33, loosely mounted on which is the driving part 29 of the clutch and the driven part 35 of the clutch. The sprocket-wheel 28 is secured to the face of the driving part of the clutch. Loose about the hub of the driving part is the annular pawl-plate 36, that carries a friction pawl-block 37, which fits in a groove 38 in the driven part 35. The pawl-plate is pivoted to the driving part 29 by a pin 34 on the opposite side of the center from the pawl. A spring 39 in a socket 40 thrusts against the pawl-plate and the hub of the driving part between the pin 34 and pawl 37, normally holding the pawl-plate eccentric, so that the pawl will slide freely in the groove when it is moved in one direction and will bind in the groove when moved in the opposite direction. This mechanism is a common friction-pawl clutch for intermittently imparting motion in one direction to a driven part and is right or left handed, according as the annular pawl-plate is pushed to one side or the other, Figs. 14, 15, and 16. An upwardly-projecting spring-wedge 42 is attached to each link 26. When the carriage moves up from the position shown in Fig. 8 to that shown in Fig. 10, the chains are so moved that the spring-wedges enter between the pawl-plates 36 and rolls 43, mounted on studs projecting from the sliding boxes, and as the spring-wedges 42 are stronger than the spiral springs 39 the pawl-plates are forced over to the opposite sides, so that the action of the pawls will be reversed.

Figure 7:
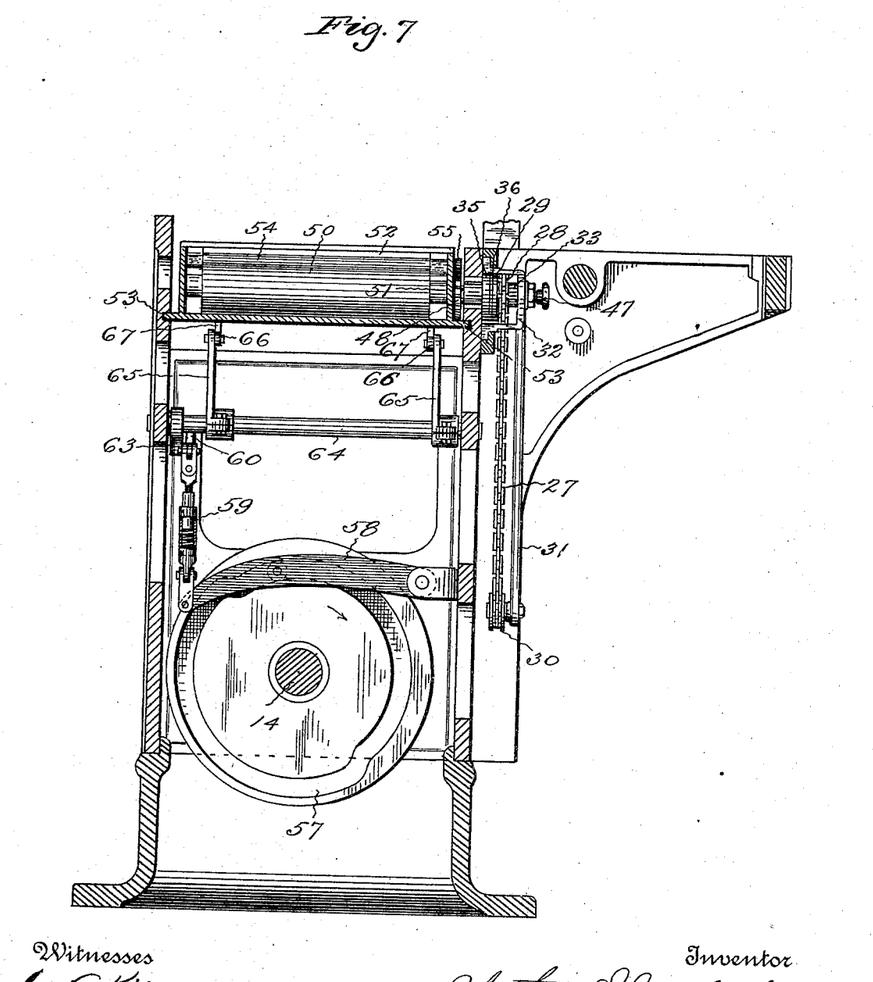
Fig. 7, a vertical section on the plane indicated by the line 7 7 of Fig. 2.
Figure 12:
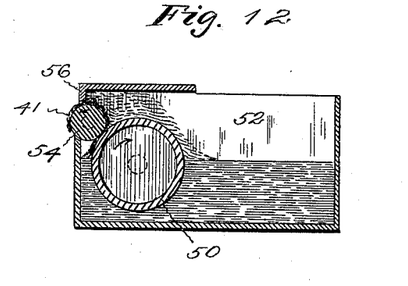
Fig. 12, a section of a paste-box and the rolls, showing the applying-roll with the extra paste upon a part of its periphery.
Figures 14, 15, 16:
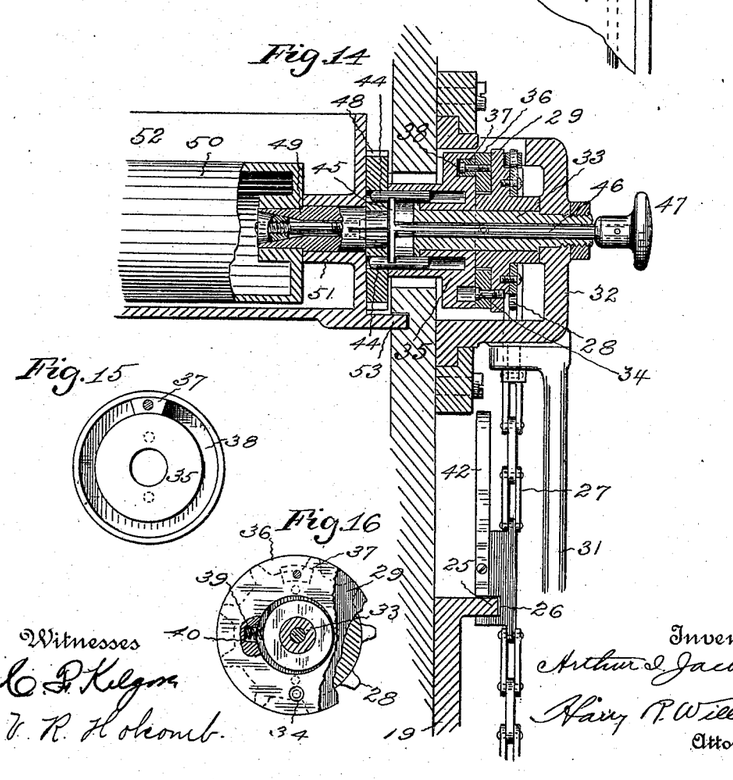
Fig. 14, an enlarged section of the mechanism for driving a paste-roll.
Fig. 15, parts of the roll-driving clutch.
Fig. 16, other parts of the clutch and driving-sprocket.

In sockets in the hub of the driven part 35 of the clutch are loose dowel-pins 44. These pins are engaged by a disk 45 on the end of a spindle 46, provided with a handle 47, Fig. 14. When the handle is pulled out, the dowel-pins are drawn within the hub of the driven part of the clutch, and when the handle is pushed in, as shown in Fig. 14, the pins project into openings in a gear 48, that is fastened to the hub 49 of a paste-distributing roll 50. Each hub 49 extends through a bearing 51 at the back end of a paste-box 52, which has flanges 53 on the bottom edge at both ends, that loosely fit grooves in the front and back frames, Figs. 7 and 14. Supported by the end walls of each paste-box is a paste-applying roll 54. The gear 48, that drives the paste-distributing roll, meshes with a pinion 55 on the axle of the applying-roll 54, so that the rolls rotate together in opposite directions, Figs. 9 and 12. The boxes are supplied with paste, and when the carriage, with the book-supporting plate, is raised the chains move and cause the clutch mechanisms to so rotate the paste-applying rolls that their applying-surfaces travel in the same direction and at the same speed as the upwardly-moving plate. As the carriage approaches the end of its upward movement the spring-wedges 42 by contact with the pawl-plates 36 reverse the action of the clutches, so that when the carriage moves downwardly as long as the wedges are between the rolls 43 and the pawl-plates 36 the applying-rolls turn backward; but when the spring-wedges pass from between the pawl-plates and the wedge-rolls the clutches resume their normal positions and the rolls stop turning backward. The action of these clutches is such that the pawls after once being caused to bite hold until the bite is released by a reverse motion. To accomplish this, the carriage raising and lowering cam 15 is so cut that just after the spring-wedges are withdrawn from between the pawl-plates and the wedge-rolls the carriage is given a slight upward movement. This releases the bite of the pawls and allows the spiral springs to throw the pawl-plates into their normal positions, so that during the further downward movement of the carriage the clutches turn free and the paste-applying rolls do not rotate. The applying-rolls are turned backwardly a little to coat a portion of their peripheries with an extra quantity of paste, as represented at 41 in Fig. 12, so that when the rolls are brought against the leaves of the book, as in Fig. 8, a larger quantity of paste will be applied near the joints, where it is necessary, than is required over the other portions of the surfaces of the leaves. The rolls apply the paste with their surfaces moving in the same direction as the surfaces of the leaves which are being pasted. The amount of paste on the surfaces of the applying-rolls when the rolls are turned backward is determined by the distance between the peripheries of the rolls and the lower edges of the gage-plates 56 along the top edges of the boxes, Fig. 12, and the amount of paste on them when they are turned forward and are applying paste to the greater part of the surfaces of the leaves is determined by the distance between the applying and distributing rolls.

On the opposite side of the disk in which is the cam-groove 15 is a cam-groove 57. This is adapted to oscillate the lever 58, that is pivoted to the back of the machine and that by an adjustable spring-link 59 is connected with the end of a rocker-arm 60 on a shaft 61, that near the front of the machine bears a toothed segment 62, that engages a toothed segment 63 on a shaft 64. Arms 65 project upwardly near the front and back of the machine from the shafts 61 and 64, and by links 66 these are connected with studs 67, that enter sockets in the bottoms of the paste-boxes, Figs. 2 and 7.

Figure 1:
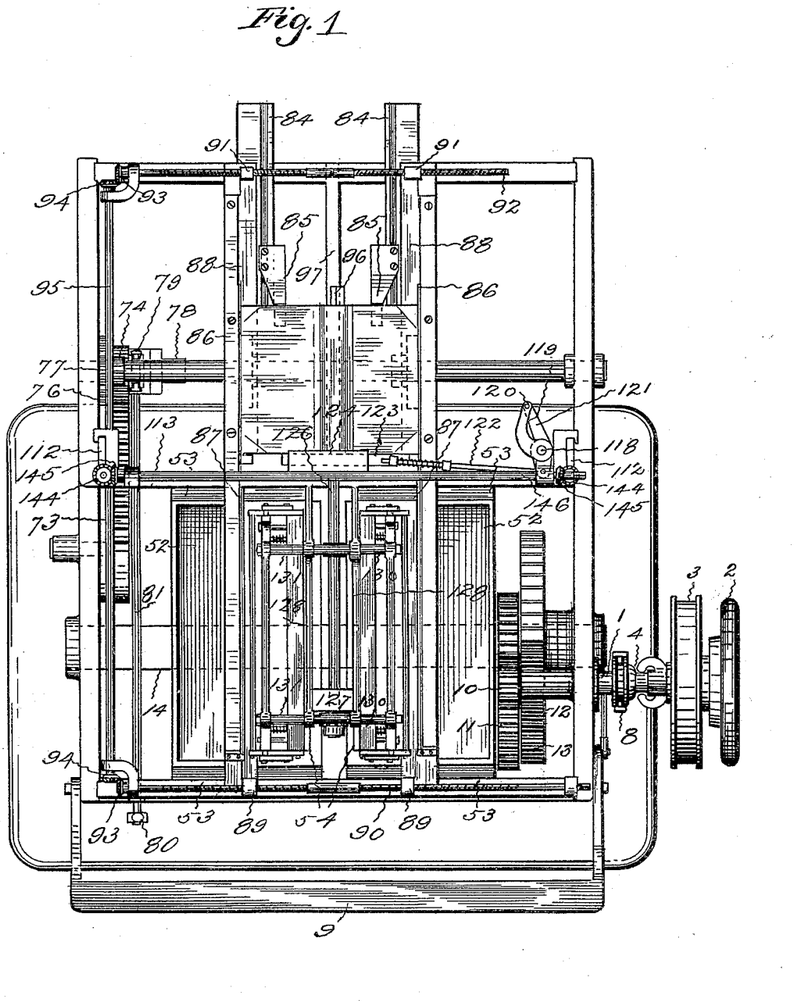
Figure 1 shows a plan of this machine.
Figure 2:
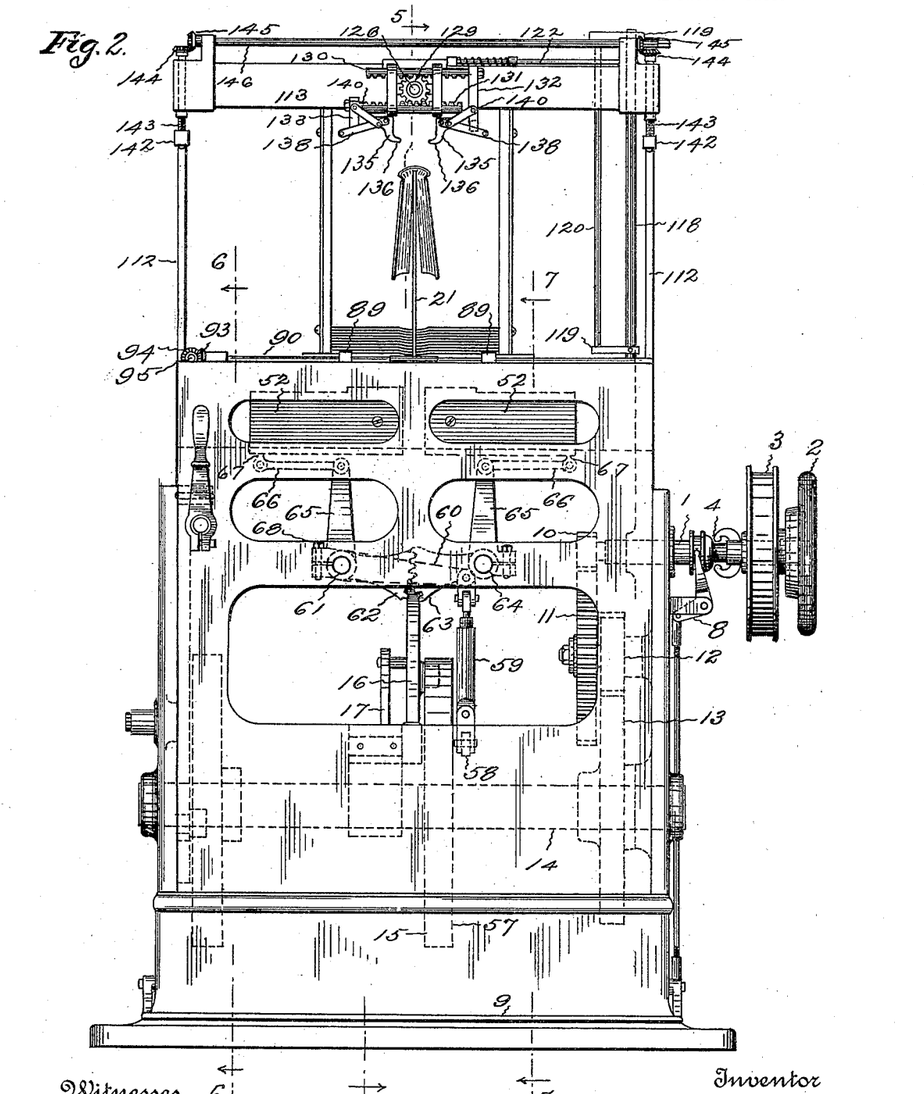
Fig. 2, a front elevation.
Figure 8:
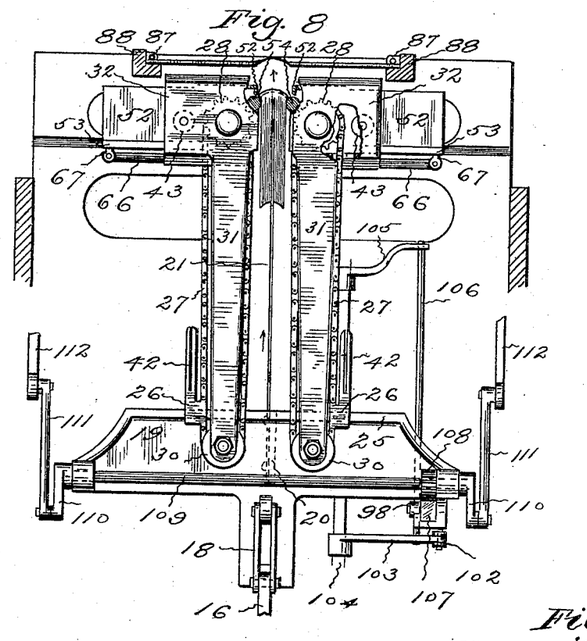
Fig. 8, a back view with the rolls applying paste at the joints of an unbound book.

The cam 57 is so timed that when the carriage, with the book-supporting plate, is at the lowest end of its movement the paste-boxes are brought together, so the applying-rolls will be in contact with the surfaces at the joints of the book to be pasted, as in Fig. 8. The boxes remain closed with the rolls against the leaves until the entire surfaces have been pasted and the carriage nearly reaches its upper limit. Then the boxes are drawn from each other and held apart, as in Fig. 10, until after the next descent of the carriage has brought another book down between the paste-rolls. When it is desired to clean the paste-boxes, the studs 67 are disengaged from the sockets in the bottoms of the boxes, and the clutch mechanisms are disconnected from the roll-driving gears by pulling out the handles 47 and withdrawing the clutch-pins. Then the paste-boxes are free to be withdrawn sidewise from the frame. When the machine is being set, the clamp-screw 68, which fastens the arm 60 to the shaft 61, Fig. 2, is loosened. Then the paste-boxes are moved to the necessary positions to properly paste the leaves, and the clamp-screw 68 is tightened. As books supposed to be the same size vary in thickness, the boxes are adjusted so that the applying-rolls will press firmly against the thinnest book of the lot, and when a thicker book is being operated upon the spring connection 59 between the cam-lever and the rocker-arm yields, so that no undue strain is caused.

Figure 6:
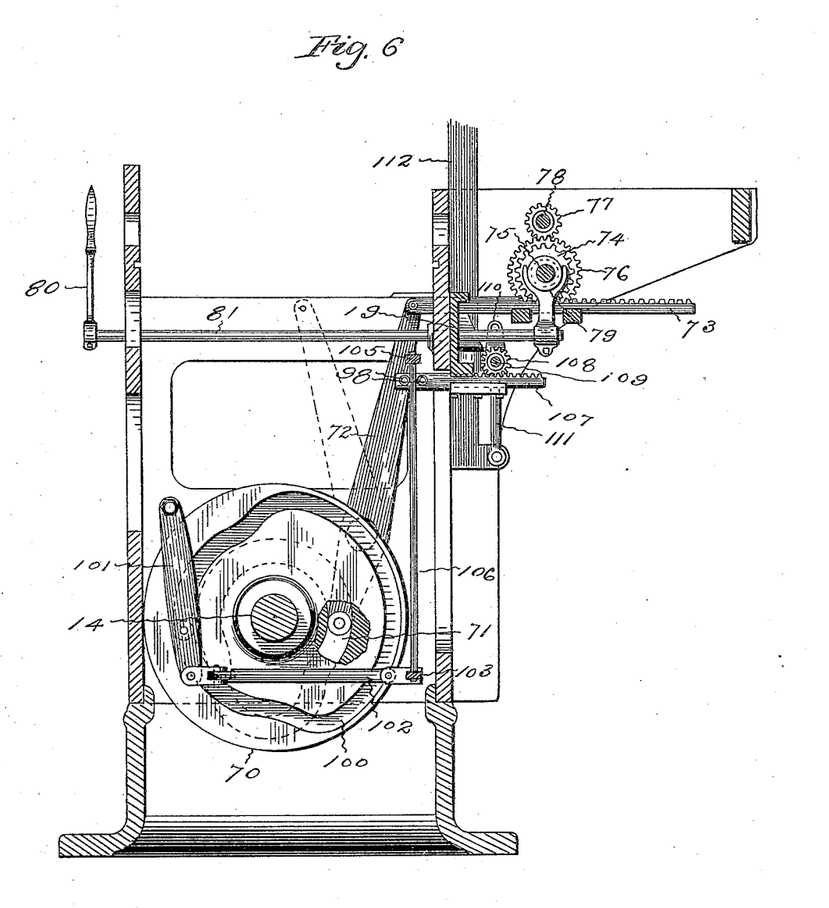
Fig. 6, a vertical section on the plane indicated by the line 6 6 of Fig. 2.

In a disk 70 on the cam-shaft is a cam-groove 71, shaped to oscillate a lever 72, that is pivoted to the side frame of the machine. The upper end of this lever is connected with a rack 73, that engages a pinion 74, which is loose upon a stud 75, that projects inwardly from the side frame of the machine, Fig. 6. At the side of the pinion 74 is a gear 76, that meshes with a pinion 77 on a shaft 78, that extends across the machine. The pinion 74 is adapted to be connected with the gear 76 by means of a clutch 79, that is operated by the handle 80 on the front end of the shaft 81, Figs. 3 and 6. Splined upon the shaft 78 are gears 82, that mesh with racks 83. These racks are on the under side of sliding bars 84, that are supported by adjustable bars 88, which extend from the front to the back of the machine. In the upper surfaces of the sliding rack-bars are grooves, movably held in which are fingers 85. These fingers are adapted to engage the back edge of the lowest case of the pile placed between the magazine-plates 86 upon the bars 88, in which the rack-bars slide, Figs. 1 and 3. The cam 71 is so timed that the rack-slides, with the fingers, are moved forward and a case pushed from the bottom of the pile into position above the book being pasted just as the book starts up between the paste-rolls, as shown in Fig. 8. While a case is being pushed forward, its outer edges are held down upon the guide-bars 88 by small rods 87, that extend from the case-magazine to the front of the machine above the guide-bars, Figs. 1 and 8. The front ends of the guide-bars 88 are loosely held by the front frame, while the back ends rest loosely on the rear cross-bar of the frame. Nuts 89 are fastened to the upper sides of the front ends of the guide-bars. Extending through these nuts is a screw 90, part of which has a right-hand thread and part a left-hand thread. Attached to the upper surfaces of the guide-bars near their rear ends are nuts 91. Extending through these nuts is a right and left threaded screw 92. The screws 90 and 92 are provided with miter-gears 93, that mesh with miter-gears 94 on a shaft 95. One end of the shaft 90 is squared for the application of a wrench, and when this shaft is rotated the screws and nuts move the guide-bars toward or from each other, according to the direction of rotation, Fig. 1. As the magazine-plates and pusher-slides are carried by the guide-bars, adjusting the guide-bars for cases of a certain size simultaneously adjusts the magazine and the case-pushers for cases of that size. The back of the magazine is formed by an upright post 96, adjustably attached to the bar 97, which extends from the rear cross-bar to the back frame and forms the bottom center piece of the magazine, Figs. 1 and 3.

Figure 17:
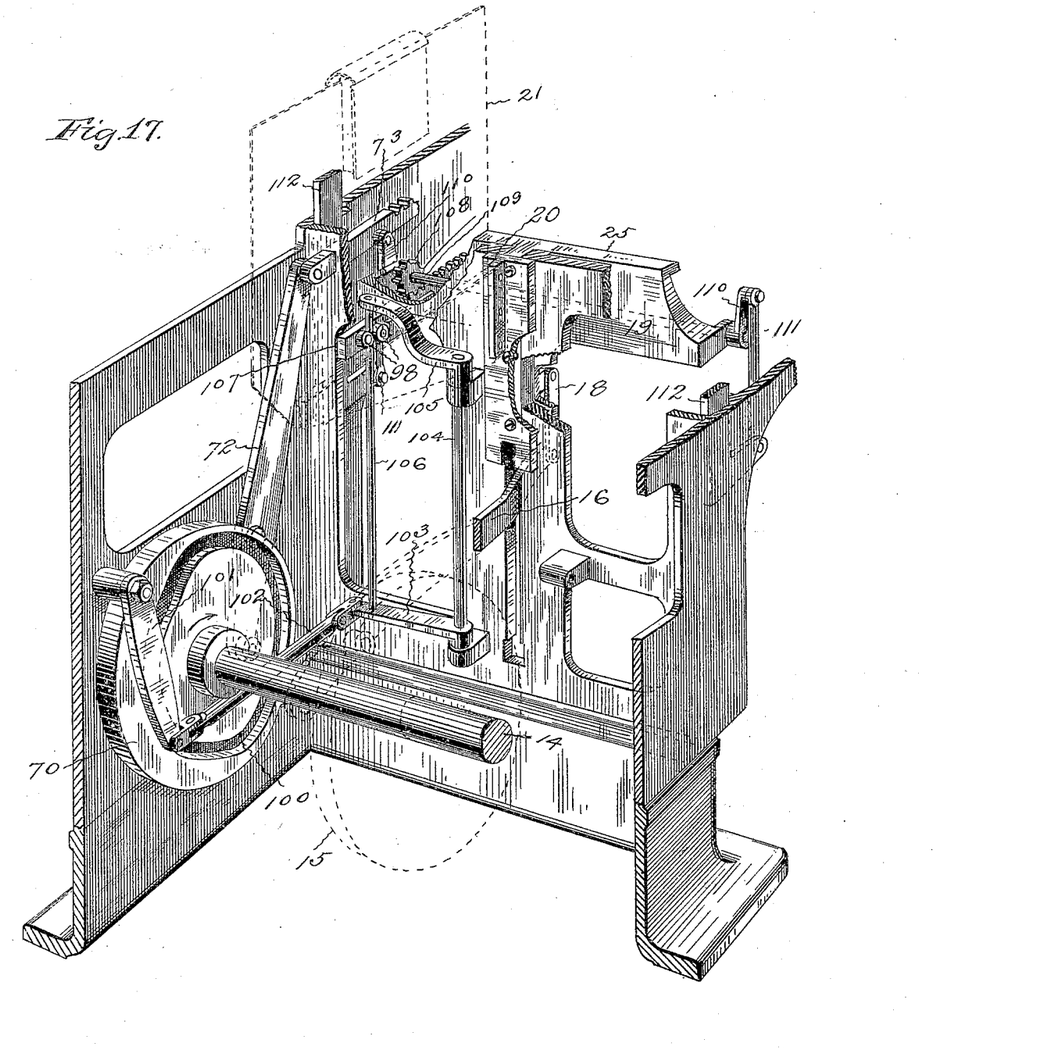
Fig. 17, a perspective of the mechanisms which operate the case-feed and which cause the stretcher, joint-former, folder, and clamps to raise and lower relatively to the book-supporting plate.

In one side of the cam-disk 70 is a cam-groove 100, that oscillates the lever 101, that is pivoted to the side frame of the machine. This lever is, by a link 102, connected with a rocker-arm 103, projecting from the vertical shaft 104, that also has a rocker 105. Between the arms 103 and 105 is a rod 106, that extends between rolls 98 on studs that project from a sliding rack 107, which engages a pinion 108 on a shaft 109, mounted in bearings on the back of the carriage 19, Figs. 6 and 17. This construction allows the cam to reciprocate the rack and rotate the shaft whether the carriage is up, as in Fig. 6, or down, as in Fig. 8. The shaft 109 at its outer ends has cranks 110, that by links 111 are connected with slide-bars 112, that are movable vertically on the insides of the side frames of the machine. Adjustably attached to and connecting the upper ends of the slide-bars is a cross-head 113, which carries the case-stretching, jointing, folding, and clamping mechanisms, Figs. 3, 5, and 13. The cross-head is carried up and down with the carriage and is also at certain intervals given an independent vertical movement by the cranks 110 on the shaft 109, bearing a gear 108, in mesh with which is the rack 107, which rack, gear, shaft, and cranks are supported by the carriage, and consequently move up and down and carry the slides and cross-head with the carriage, Figs. 3, 5, and 8.

In one face of the gear 13 is a cam-groove 114, which is adapted to oscillate a lever 115, pivoted to the side frame. Attached to the free end of this lever is a horizontal rack 116, that engages a pin 117 on the lower end of a vertical shaft 118. Projecting from the shaft 118 are two arms 119, that are connected by a rod 120, Figs. 3, 4, and 5. A lever 121 is pivotally supported upon the upper edge near one end of the cross-head, Figs. 3 and 4. The vertical shaft 118 forms the axis of this lever 121, which moves up and down with the cross-head 113. One end of this lever loosely engages and moves up and down the vertical rod 120 as the cross-head moves, Figs. 3 and 4, and the other end of this lever is connected by a spring-link 122 with a rack 123, movable transversely in ways 124, secured to the back edge of the cross-head, Figs. 1 and 3. The rack 123 engages a segment 125, that is adjustably attached to the shaft 126, which is supported by the cross-head and the block 127 between the arms 128, that project forwardly from the cross-head, Figs. 1 and 18. On the shaft 126 are two pinions 129. Each pinion engages a rack 130 above and a rack 131 below. The racks 130 support a bar 132, and the racks 131 support a bar 133, Fig. 18.

Figure 3:
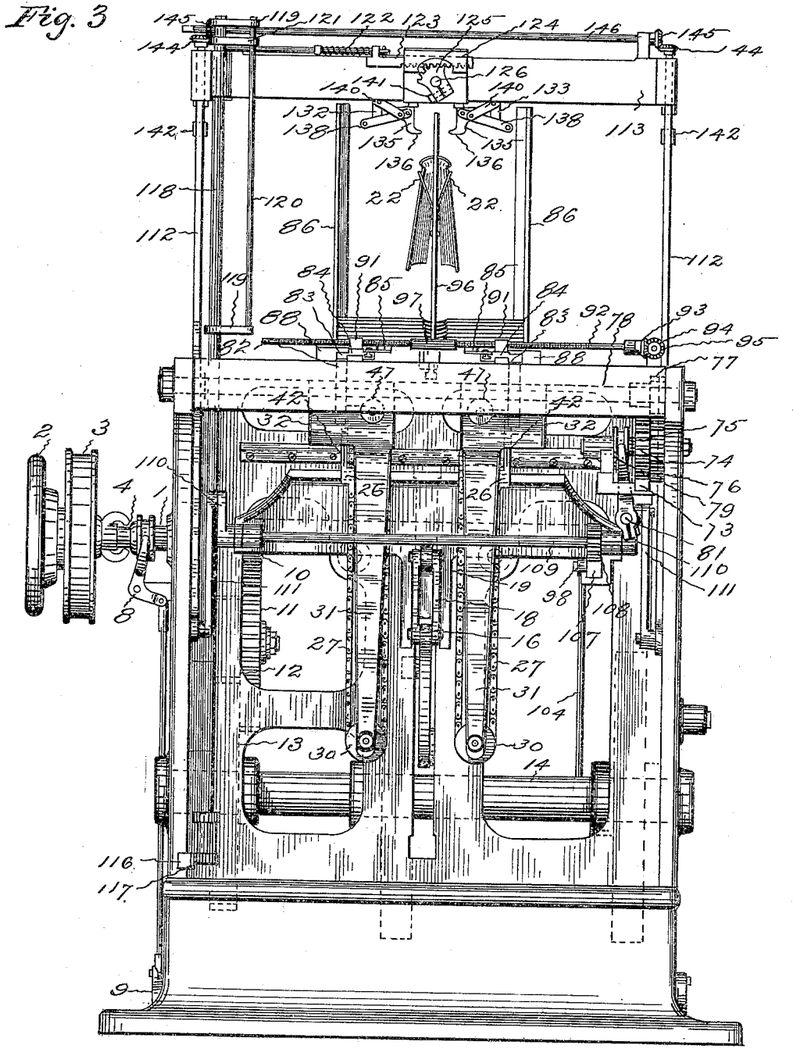
Fig. 3, a rear elevation.
Figure 18:
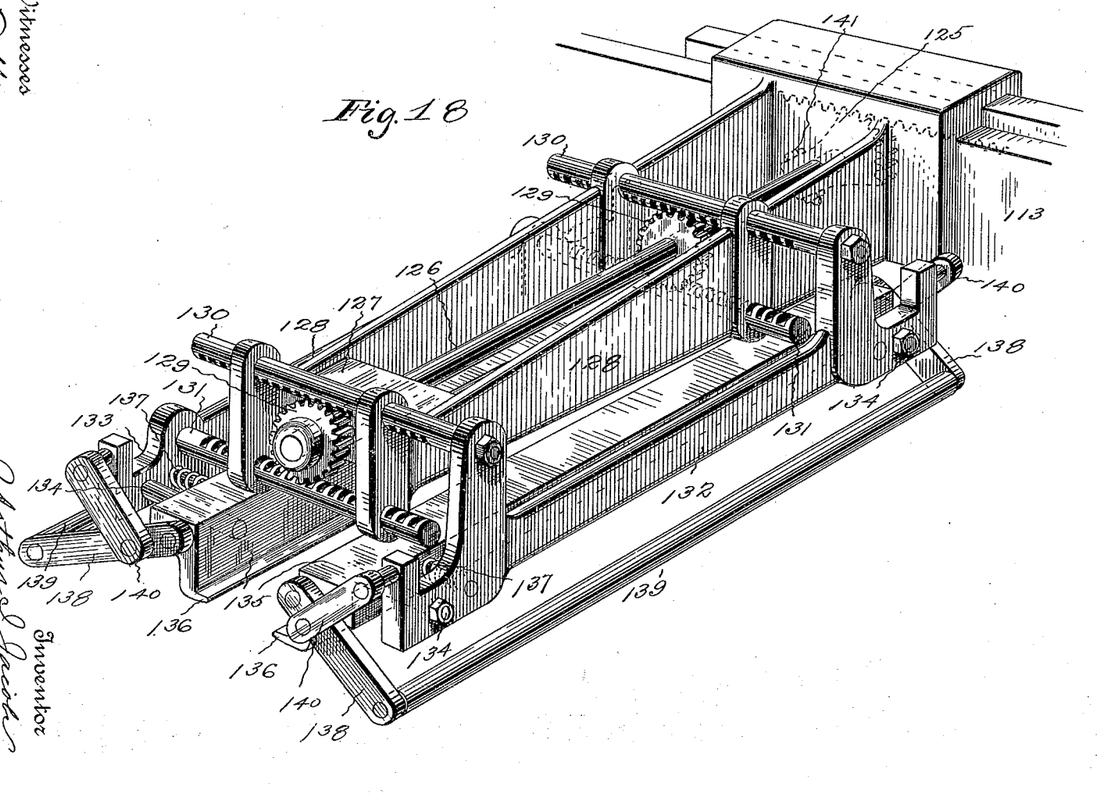
Fig. 18, a perspective of the stretcher, joint-former, folder, and clamp.

On studs 134, that project inwardly from the bars 132 and 133, are bars 135, having inwardly-projecting jaws 136 along their lower edges, Fig. 18. These jaws stretch the back of the case across the back of the book and form the joints when the case is being applied to the book, Figs. 19 and 20. The bars 135 are normally held from the bars 132 and 133 by springs 137. Pivoted to each end of each bar 135 is a lever 138. The levers 138 on the same side are connected by a rod 139. A link 140 connects each end of each bar 132 and 133 with the adjacent lever 138. By these connections a change in the positions of the bars 135 relatively to the bars 132 and 133 gives the rods 139 swinging movements, Figs. 3, 13, and 18. When the screw 141, Figs. 3 and 18, is turned so as to loosen the segment 125 from the shaft 126, the bars 132 and 133, carrying the bars 135, may be freely moved toward and from each other, and when these bars are adjusted such a distance apart as to properly stretch a case-back over a book and form the joints correctly the screw 141 is tightened to clamp the segment to the shaft.

Figure 4:
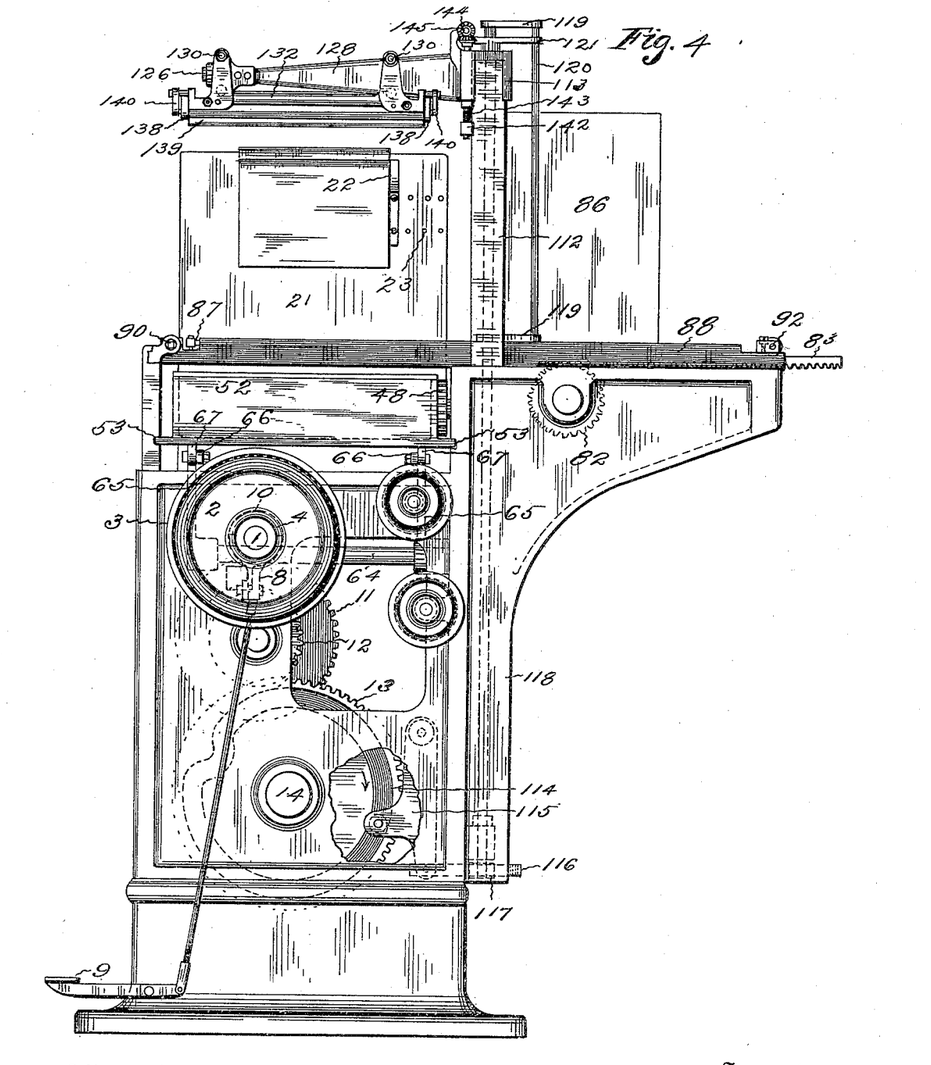
Fig. 4, an elevation looking from the right.
Figure 13:
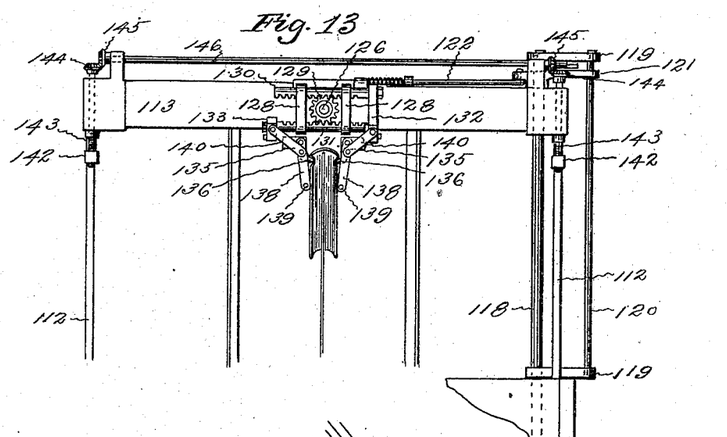
Fig. 13, the back of the case-stretching, joint-forming, leaf-folding, and clamping mechanisms.

Nuts 142 on screws 143, Figs. 4 and 13, project into recesses in the upright bars 112. These screws pass through the ends of the cross-head 113 and on their upper ends have miter-gears 144, with which mesh miter-gears 145 on a shaft 146, one end of which is squared for the application of a wrench. When the shaft 146 is rotated by these gears and screws, the level of the cross-head relatively to the ends of the upright bars is changed, Figs. 1, 4, and 13.

Figures 9, 19, 20:
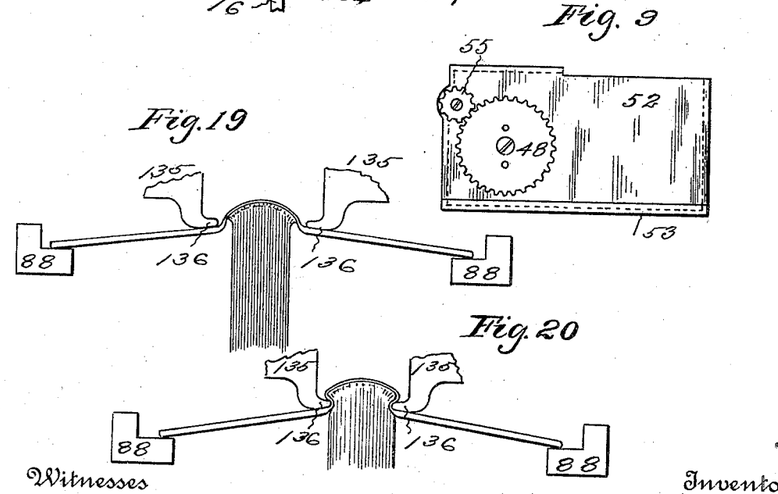

When the book-supporting plate is up, as in Fig. 2, an unbound book is opened near the middle and placed upon it, with its top edge resting against the feed-gage, as in Fig. 4. After the mechanism has been adjusted for the size of book to be cased the treadle is depressed and the machine operates. As the supporting-plate, with the book, commences to descend the paste-applying rolls, which at this time are away from the book, are rotated backward in order to coat a part of their peripheries with an extra quantity of paste. After the rolls have been provided with the extra paste the plate is slightly lifted and then lowered. As the plate, with the unbound book, approaches its lowest position the paste-boxes are moved toward each other, so that when the book is at its lowest position the applying-rolls make contact with the outer surfaces close under the joints, as in Fig. 8. While the plate, with the unbound book, is below and is coming up to the level of the case-support, a case is pushed over the book from the bottom of the pile in the magazine. About the time that the plate has lowered the unbound book to its lowest position the crank mechanism which raises and lowers the head with relation to the supporting-plate begins to lower the stretching-jaws, which reach their lowest position with relation to the plate immediately after the book has been lifted against the back of the case. This causes the jaws to stretch the back of the case tightly over the back of the book, as illustrated in Fig. 19. As the book continues to rise the jaws, which move upwardly with it, are brought toward each other by the action of the racks and pinions, so as to pinch the case along the joints, as shown in Fig. 20. The book continues to rise and the racks and pinions continue to act; but as the jaws are pressing tightly against the book and cannot move farther together the springs 137 yield and the outer bars move toward the inner against the pressure of the springs. This change of relation between the bars 132, 133, and 135 so moves the levers 138 and the links 140 that the rods 139 are swung downwardly and close the leaves of the case against the pasted leaves of the book. The book and case are thus clamped together until they reach the upper limit. Then the folders and clamps open, and while the carriage and plate dwell the head is lifted away from the book by means of the crank mechanism, so that the bound book may be removed from the supporting-plate. While the plate is in its upper position, the paste-boxes are moved away from each other, so that when the next book is brought down its leaves will not accidentally engage the paste-rolls.

By means of this machine an unbound book can be quickly given a proper coating of the necessary quantity of paste to desirably secure the case into which it is thrust. The actions of the mechanisms are such that the case and outer leaves of the unbound book are secured close at the joints, and the mechanisms are all adjustable, so that books of ordinary sizes may be quickly and accurately cased.

I claim as my invention—

1. In a casing-in machine, a book-support, mechanism for applying paste to the outside leaves of a book on the support, a head with blade-like jaws that open to permit the entrance of the back of a case and the back of a book between them and then close to stretch the back of the case over the back of the book and form the case-joints, and mechanism for moving the support and the head relatively to each other for stretching the back of a case over the back of a book, substantially as specified.

2. In a casing-in machine, a book-support, mechanism for applying paste to the outside leaves of a book on the support, a head with stretching-jaws, mechanism for moving the support and the head relatively to each other for stretching the back of a case over the back of a book, and mechanism for opening and closing the jaws for forming the joints, substantially as specified.

3. In a casing-in machine, a book-support, mechanism for applying paste to the outside leaves of a book on the support, a head with stretching-jaws, mechanism for moving the support and the head relatively to each other for stretching the back of a case over the back of a book, mechanism for opening and closing the jaws for forming the joints, and mechanism for folding and clamping the leaves of the case against the pasted leaves of the book, substantially as specified.

4. In a casing-in machine, a book-support, mechanism for applying paste to the outside leaves of a book on the support, mechanism for feeding a case from a magazine above the support, a head with blade-like jaws that open to permit the entrance of the back of a case and the back of a book between them and then close to stretch the back of the case over the back of the book and form the case-joints, and mechanism for moving the support and the head relatively to each other for stretching the back of a case over the back of a book, substantially as specified.

5. In a casing-in machine, a book-support, mechanism for applying paste to the outside leaves of a book on the support, mechanism for feeding a case from a magazine over the support, a head with stretching-jaws, mechanism for moving the book-support and the head relatively to each other for stretching the back of a case over the back of a book, and mechanism for opening and closing the jaws for forming the joints, substantially as specified.

6. In a casing-in machine, a book-support, mechanism for applying paste to the outside leaves of a book on the support, mechanism for feeding a case from a magazine over the support, a head with stretching-jaws, mechanism for moving the support and the head relatively to each other for stretching the back of a case over the back of a book, mechanism for opening and closing the jaws for forming the joints, and mechanism for folding and clamping the leaves of a case against the pasted leaves of the book, substantially as specified.

7. In a casing-in machine, a book-support, mechanism for applying paste to the outside leaves of a book on the support, a head with stretching-jaws, mechanism for moving the head vertically, and mechanism for moving the jaws horizontally, substantially as specified.

8. In a casing-in machine, a book-support, mechanism for applying paste to the outside leaves of a book on the support, a head with stretching-jaws and folding-bars, mechanism for moving the head vertically, mechanism for moving the jaws horizontally, and mechanism for swinging the folding-bars, substantially as specified.

9. In a casing-in machine, a book-support, mechanism for applying paste to the outside leaves of a book on the support, a head with stretching-jaws and folding-bars, mechanism for moving the head vertically, mechanism for moving the jaws horizontally, yielding connections between the horizontally-moving stretching-jaws and the folding-bars, whereby the horizontally-moving-jaw mechanism causes the swinging of the folding-bars when the jaws are forming the joints, substantially as specified.

10. In a casing-in machine, a vertically-movable carriage with a book-support and a head with stretching-jaws, mechanism for moving the carriage with the support and head vertically, and mechanism for moving the head vertically independently of the support, substantially as specified.

11. In a casing-in machine, a vertically-movable carriage with a book-support and a head with stretching-jaws and folding-bars, mechanism for moving the carriage with the support and head vertically, and mechanism for moving the head vertically independently of the carriage and swinging the bars independently of the jaws, substantially as specified.

12. In a casing-in machine, a vertically-movable carriage with a book-support and a head with stretching-jaws, mechanism for moving the carriage with its support and head vertically, mechanism for moving the head vertically independently of the carriage, and mechanism for moving the jaws horizontally, substantially as specified.

13. In a casing-in machine, a vertically-movable carriage with a book-support and a head with stretching-jaws, mechanism for applying paste to the outside leaves of a book on the support, mechanism for moving the carriage with the support and jaws vertically, and mechanism for moving the head vertically independently of the carriage, substantially as specified.

14. In a casing-in machine, a vertically-movable carriage with a book-support and a head with stretching-jaws and folding-bars, mechanism for applying paste to the outside leaves of a book on the support, mechanism for moving the carriage with the support, jaws and bars vertically, and mechanism for moving the head vertically independently of the carriage and swinging the bars independently of the jaws, substantially as specified.

15. In a casing-in machine, a vertically-movable carriage with a book-support and a head with stretching-jaws, mechanism for applying paste to the outside leaves of a book on the support, mechanism for moving the carriage with the support and jaws vertically, mechanism for moving the head vertically independently of the carriage, and mechanism for moving the jaws horizontally, substantially as specified.

16. In a casing-in machine, a vertically-movable carriage with a book-support and a head with stretching-jaws, mechanism for feeding a case over the support, mechanism for moving the carriage with the support and jaws vertically, and mechanism for moving the jaws horizontally independently of the carriage, substantially as specified.

17. In a casing-in machine, a vertically-movable carriage with a book-support and a head with stretching-jaws and folding-bars, mechanism for feeding a case over the support, mechanism for moving the carriage with the support, jaws and bars vertically, and mechanism for moving the head vertically independently of the carriage and swinging the bars independently of the jaws, substantially as specified.

18. In a casing-in machine, a vertically-movable carriage with a book-support and a head with stretching-jaws, mechanism for feeding a case over the book-support, mechanism for moving the carriage with the support and jaws vertically, mechanism for moving the head vertically independently of the carriage, and mechanism for moving the jaws horizontally, substantially as specified.

19. In a casing-in machine, a vertically-movable carriage with a book-support and a head with stretching-jaws, mechanism for applying paste to the outside leaves of a book on the support, mechanism for feeding a case over the support, mechanism for moving the carriage with the support and jaws vertically, and mechanism for moving the head vertically independently of the carriage, substantially as specified.

20. In a casing-in machine, a vertically-movable carriage with a book-support and a head with stretching-jaws and folding-bars, mechanism for applying paste to the outside leaves of a book on the support, mechanism for feeding a case over the support, mechanism for moving the carriage with the support, jaws and bars vertically, and mechanism for moving the head vertically independently of the carriage and swinging the bars independently of the jaws, substantially as specified.

21. In a casing-in machine, a vertically-movable carriage with a book-support and a head with stretching-jaws, mechanism for applying paste to the outside leaves of a book on the support, mechanism for feeding a case over the support, mechanism for moving the carriage with the support and jaws vertically, mechanism for moving the head vertically independently of the carriage, and mechanism for moving the jaws horizontally, substantially as specified.

22. In a casing-in machine, a vertically-movable carriage with a book-support and a head with stretching-jaws, paste-boxes movable toward and from the book-support, paste-rolls carried by the boxes, and mechanism connecting the carriage and the rolls whereby the rolls are rotated for applying paste when the support is raised between them, substantially as specified.

23. In a casing-in machine, a vertically-movable carriage with a book-support, paste-boxes movable toward and from the book-support, paste-rolls carried by the boxes, mechanism connecting the carriage and the rolls whereby the rolls are rotated for applying paste when the support is raised between them, and rotated oppositely during a portion of the downward movement of the support, substantially as specified.

24. In a casing-in machine, a vertically-movable carriage with a book-support and a head with stretching-jaws, paste-boxes movable toward and from the support, paste-rolls carried by the boxes, mechanism connecting the carriage and the rolls whereby the rolls are rotated for applying paste when the support is raised between them, and mechanism for feeding cases from a magazine over the support, substantially as specified.

25. In a casing-in machine, a vertically-movable carriage with a book-support and stretching-jaws, paste-boxes movable toward and from the support, paste-rolls carried by the boxes, mechanism connecting the carriage and the rolls whereby the rolls are rotated for applying paste when the support is raised between them, mechanism for moving the carriage with the support and jaws vertically, and mechanism for moving the jaws vertically independently of the carriage, substantially as specified.

26. In a casing-in machine, a vertically-movable carriage with a book-support and stretching-jaws and folding-bars, paste-boxes movable toward and from the support, paste-rolls carried by the boxes, mechanism connecting the carriage and the rolls whereby the rolls are rotated for applying paste when the support is raised between them, mechanism for moving the carriage with the support, jaws and bars vertically, and mechanism for moving the jaws vertically independently of the carriage and swinging the bars independently of the jaws, substantially as specified.

27. In a casing-in machine, a vertically-movable carriage with a book-support and stretching-jaws, paste-boxes movable toward and from the support, paste-rolls carried by the boxes, mechanism connecting the carriage and the rolls whereby the rolls are rotated for applying paste when the support is raised between them, mechanism for moving the carriage with the support and jaws vertically, mechanism for moving the jaws vertically independently of the carriage, and mechanism for moving the jaws horizontally, substantially as specified.

28. In a casing-in machine a vertically-movable carriage with a book-support, mechanism for feeding a case from a magazine over the support, paste-boxes movable toward and from the support, paste-rolls carried by the boxes, mechanism connecting the carriage and the rolls whereby the rolls are rotated for applying paste when the support is raised between them, and rotated oppositely during a portion of the downward movement of the support, substantially as specified.

29. In a casing-in machine, a vertically-movable carriage with a book-support and stretching-jaws, mechanism for moving the carriage with the support and jaws vertically, mechanism for raising and lowering the stretching-jaws independently of the carriage, mechanism for opening and closing the jaws, mechanism for feeding a case from a magazine over the support, paste-boxes movable toward and from the support, paste-rolls carried by the boxes, mechanism connecting the carriage and the rolls whereby the rolls are rotated for applying paste when the support is raised between them, and rotated oppositely during a portion of the downward movement of the support, substantially as specified.

30. In a casing-in machine, a vertically-movable carriage with a book-support, paste-boxes movable toward and from the support, paste-rolls carried by the boxes, mechanism connecting the carriage and the rolls whereby the rolls are rotated for applying paste when the support is raised between them, and rotated oppositely during a portion of the downward movement of the support, and means for disengaging the connecting mechanism between the carriage and the rolls, substantially as specified.

31. In a casing-in machine, a book-support, mechanism for applying paste to the outside leaves of a book on the support, mechanism for feeding a case from a magazine over the support, means for disconnecting the case-feeding mechanism, a head with stretching-jaws, mechanism for moving the support and head relatively to each other for stretching the back of a case over the back of a book, and mechanism for closing the jaws for forming the joints, substantially as specified.

32. In a casing-in machine, a vertically-movable book-support, paste-boxes, mechanism for moving the boxes horizontally toward and from each other, a yielding connection between the horizontally-moving boxes and the mechanism for moving the boxes, a head movable with the support, also independently thereof, mechanism for moving the support vertically and mechanism for moving the head vertically, substantially as specified.

33. In a casing-in machine, a vertically-movable book-support, paste-boxes, mechanism for moving the boxes horizontally toward and from each other, a yielding connection between the horizontally-moving boxes and the mechanism for moving the boxes, a head movable with the support and independently thereof, mechanism for moving the support vertically, mechanism for moving the head vertically, and mechanism for feeding a case from a magazine over the support, substantially as specified.

34. In a casing-in machine, a book-support, mechanisms for applying paste to the outside leaves of a book on the support, a head with stretching-jaws, mechanism for moving the support and the head relatively to each other for stretching the back of a case over the back of a book, and an adjustable connection between the head and the mechanism for moving the head, substantially as specified.

35. In a casing-in machine, a book-support, mechanisms for applying paste to the outside leaves of a book on the support, mechanism for feeding a case from a magazine over the support, means for adjusting the magazine and the feeding mechanism to different sizes of books, a head with stretching-jaws, and mechanism for moving the support and the head relatively to each other for stretching the back of a case over the back of a book, substantially as specified.

36. In a casing-in machine, a book-support, mechanism for applying paste to the outside leaves of a book on the support, a head with stretching-jaws, mechanism for moving the support and the head relatively to each other for stretching the back of a case over the back of a book, and mechanism with yielding connections for opening and closing said jaws for forming the joints, substantially as specified.

ARTHUR I. JACOBS.

Witnesses:
H. R. WILLIAMS,
V. R. HOLCOMB.